Aug. 27, 1940.  A. ZINKE  2,212,805
PROCESS FOR MAKING GASOLINES OF HIGH QUALITY
Original Filed April 15, 1936
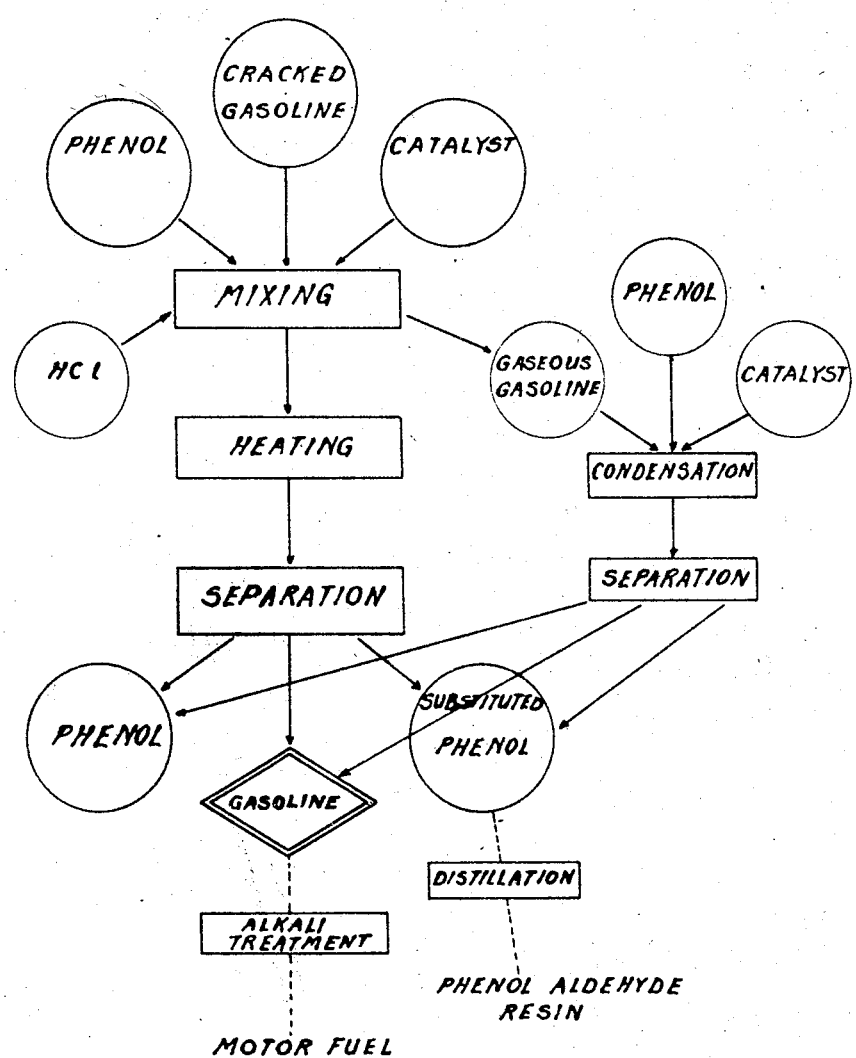
Alois Zinke
Inventor.
Munson H. Lane
Attorney Patented Aug. 27, 1940

2,212,805

UNITED STATES PATENT OFFICE 2,212,805

PROCESS FOR MAKING GASOLINES OF HIGH QUALITY

Alois Zinke, Graz, Austria, assignor to Reichhold Chemicals, Inc., Detroit, Mich., a corporation of Delaware Original application April 15, 1936, Serial No. 74,595. Divided and this application September 29, 1936, Serial No. 103,213. In Austria May 7, 1935

2 Claims. (Cl. 196—35)

This invention relates to a process for preparing gasolines of high quality, which consists in that phenol or its homologues are condensed with cracked gasolines which contain compounds having non-aromatic multiple linkages, and in removing the substituted phenols formed.

The present application is a division of Serial No. 74,595, filed April 15, 1936, now Patent No. 2,154,192, dated April 11, 1939.

An object of my invention consists in preparing gasolines of high quality which are substantially free from compounds having unsaturated non-aromatic linkages.

Another object of my invention consists in preparing phenols which are substituted by one or more hydrocarbon radicals having a relatively high number of aliphatic or alicyclic C-atoms, which phenols may serve for the preparation of oil-soluble phenolic resins. This object forms the subject matter of my patent No. 2,154,192 referred to above.

Condensation between the phenols and the unsaturated hydrocarbons is theoretically possible by the use of various contact agents such as sulfuric or hydrochloric acid with or without the addition of glacial acetic acid, halides of aluminium, iron, zinc and the like in conjunction with hydrogen halides. Instead of hydrogen halide any reactive hydrocarbon halide may serve for starting the reaction.

According to the present invention, however, I proceed according to the method of Friedl-Crafts, employing a metal halide catalyst such as anhydrous aluminum or ferric chloride, and find that markedly improved technical results are obtained where proceeding according to this method.

The accompanying drawing is a flow sheet of the complete process of the present invention.

Not all unsaturated hydrocarbons are equally capable of undergoing such reactions; those hydrocarbons apparently are mainly suited which by chemical addition of hydrogen halide or water form tertiary compounds. Thus such olefinic or polyolefinic substances are particularly adapted to undergo the said condensation reaction in which the double linkages are located at tertiary carbon atoms, i. e. the substances should contain one or more groups as indicated by the formula

in which R and R' represent monovalent hydrocarbon radicals whilst R" and R''' may be such radicals or hydrogen.

Now I have found that the cracked gasolines are rich in unsaturated non-aromatic compounds which are well adapted for the formation of substituted phenols by means of any of the methods mentioned above. In most cases the said unsaturated compounds can be taken up quantitatively by the phenol or at least mainly.

My invention is not only of great importance since valuable substituted phenols are obtained in a very economical way but also due to the fact that the hydrocarbons which did not enter the reaction are no more deteriorated by the disturbing odor of cracked gasolines. Depending upon the source and still more upon the process of the preparation of the cracked gasoline these above mentioned remaining hydrocarbons consist almost entirely of benzene and its homologues or of mixtures thereof with hydrocarbons of paraffin nature or also mainly of the latter. I wish to mention particularly that all those unsaturated hydrocarbons which tend to autoresinification owing to a plurality of double linkages participate in the reaction. It is apparent that their elimination from cracked gasoline which serves as fuel for internal combustion engines is of great technical importance.

When using anhydrous aluminum or ferric chloride or other analogically behaving metal halides the condensation reaction is easily performed. In this case the addition of hydrogen halide may be dispensed with since traces thereof are usually formed due to the influences of humidity on the metal halide. Zinc chloride and other similarly behaving metal halides render the addition of a hydrogen halide necessary. It is, however, more advisable to use the latter in statu nascendi, which can be done e. g. by co-employing an acyl halide or more suitably a readily reactive hydrocarbon halide. Such a halide is e. g. a tertiary hydrocarbon halide or benzylchloride and the like.

For my process I may use common phenol, or its homologues, such as the cheap technical mixtures of cresols, xylenols; naphthols; polyoxybenzenes and polyvalent polynuclear phenols, e. g. dioxynaphthalenes. If substituted phenols intended for the preparation of pale resins are aimed at I prefer the use of common phenol and of cracked gasolines which do not contain polyolefinic substances. The substituted phenols obtained are readily and almost quantitatively distillable and are practically colorless in the distilled form. On the contrary substituted phenols obtained from cracked gasoline rich in unsaturated hydrocarbons having a plurality of double linkages are, if at all, only in part distillable; if subjected to distillation in vacuo at least a considerable portion of the product remains behind as a non-distillable, hard, resinous residue. This residue may also be immediately employed in the varnish industry particularly due to its very good solubility in drying oils. Resins of this kind having a pronounced phenolic character are often of particular value and importance in preparing oil varnishes.

While the condensation between the phenol and the monoolefinic portion of a cracked gasoline apparently takes place in practically invariable stoichiometric proportions i. e. more or less independent of the proportions employed, the polyolefinic hydrocarbons may interact with the phenol in various proportions. The ratio in which the components enter into combination within certain limits depends on the proportions used, the catalyst employed and the reaction temperature. The condensation reaction between the phenol and the polyolefine probably takes place in individual steps i. e. initially only by the mediation of a single double linkage; the phenolic body formed having an unsaturated substituent then polymerizes by the action of the catalyst (metal halide and hydrogen halide); or there may also be formed chain-like macro-molecules in consequence of the plurality of reactive places both in the polyolefine and in the phenol. The higher boiling polyolefinic portions of cracked gasolines are capable of yielding solid resins readily soluble in fatty oils directly (i. e. without eliminating low molecular condensation products by distillation in vacuo), particularly if relatively small proportions of phenol are employed.

The most volatile portions of cracked gasolines, which have a very low boiling point and may be gaseous at room temperature, predominantly consist of unsaturated hydrocarbons having up to five carbon atoms. On passing hydrogen halide through the mixture of phenol and cracked gasoline they escape to a large extent if no special provision is taken. It is e. g. advisable to conduct them in conjunction with hydrogen halide over suitable contact agents and to separately collect the alkyl halides formed hereby and to condense only these with the phenol. The same reaction may of course also be carried out with all of the gasoline, this, however, being of no advantage as compared with directly reacting the phenol with unsaturated hydrocarbons. They may also be passed through phenol in excess or more suitably through a reaction mixture in which in addition thereto there is formed hydrogen halide in statu nascendi. These volatile olefines may also be retained in another way viz. in that they are e. g. passed through tertiary alcohols. These are like all alcohols suitable solvents, and by the action of hydrogen halide not only the tertiary halide corresponding to the alcohol but simultaneously also the addition product from hydrogen halide and olefine is formed. The volatile olefines may also be collected in a sufficient quantity of certain hydrocarbons such as dipentene, which, owing to their structure, are capable of forming addition products of hydrogen halide which in turn readily enter into reaction with phenol. The absorbed olefines then readily take part in this reaction which is due to the hydrogen halide in statu nascendi.

I wish to be understood that the following examples are only of illustrative character and that my invention is not restricted to the special features. A very large number of cracking processes are known, which may be perhaps divided into several characteristic groups. According to one process cracking is performed in the liquid phase with the application of more or less high pressure in the absence of special catalytic agents. The processes according to Ellis, Dubbs, Burton and others apparently are the most developed ones and may be regarded as representatives of this group. The cracked gasolines obtained by a process of this group contain saturated hydrocarbons and a varying proportion of olefinic hydrocarbons whilst no or only small proportions of aromatic hydrocarbons are present. Another method, of which the processes developed by Gyro or by Knox may be regarded as examples consists in exposing the oils to be cracked to particularly high temperatures in the vapor phase generally without application of pressure. Slightly active contact masses may be present in some of these processes. The gasolines obtained are particularly rich in unsaturated hydrocarbons which mainly consist of olefinic, polyolefinic and aromatic hydrocarbons. A third group is characterised by the use of highly active catalysts such as aluminum chloride and by the application of relatively low temperatures mostly without pressure. The gasolines obtained have a relatively very low proportion of unsaturated hydrocarbons and therefore are of only poor interest for my process.

Finally I wish to state that any cracked gasoline rich in unsaturated non-aromatic hydrocarbons is suited for my process irrespective of the method according to which it has been prepared and the origin of the stuffs which have been cracked. Such stuffs are in the first place those petroleum fractions of low value, more particularly the so-called gas oil, which in general can neither be used as motor fuel nor for lubricating purposes and mostly serve as fuel oil; but also other oxygen-free or oxygen-containing more or less high molecular organic compounds of vegetable or animal origin, such as bituminous oils (shale oil, shale tar oil) or similar products such as are obtained from low-temperature carbonization of brown or black coal; waste fats and fatty oils.

*Example 1*

Gaseous hydrogen chloride is passed through a mixture of 1000 grms. gasoline of American origin obtained by cracking high boiling fractions of petroleum under pressure at temperatures surpassing 400° C. and in the absence of catalysts, 700 grms. phenol and 40 grms. aluminum chloride. The temperature is then increased to 80° C. and maintained for 16 hours. Thereupon the reaction mixture is freed from the portions of the gasoline and the phenol, which did not enter into reaction, by means of a current of steam; the separation may also be effected after washing by common distillation and subsequent vacuum distillation.

Thus about 380 grms. of gasoline which did not enter into reaction, 295 grms. of unaltered phenol and 705 grms. of a mixture of substituted phenols are obtained. The latter is of brown color and may be distilled in vacuo almost completely whereby a colorless product is obtained which is particularly suited for the preparation of oil soluble formaldehyde resins. The main quantity passes over between 150 and 250° C. (12 mms.).

The specific gravity of the original cracked gasoline is 0.723/15° C. The gasoline contains about 60 per cent unsaturated hydrocarbons, partly of aromatic, mainly, however, of olefinic nature, and about 40 per cent saturated hydrocarbons. The specific gravity of the recovered gasoline is 0.786/15° C. This gasoline consists of about 15 per cent unsaturated, mainly aromatic hydrocarbons and of about 85 per cent paraffin-hydrocarbons. It is completely relieved of the penetrating odor of the cracked gasoline.

The gaseous portions, i. e. about 320 grms., which escape on carrying through the condensation, may be utilized in the way described in Example 2. The condensation reaction may also be carried through at lower temperature e. g. at 40° C., the reaction period being then suitably substantially protracted. The loss in gaseous portions is then substantially smaller. In this way also substituted phenols are obtained which yield aldehyde resins being by far more light-proof.

When replacing the cracked gasoline used in this example by any other obtained in an equivalent way, also if it is of another origin, e. g. Roumanian, very similar results are obtained.

*Example 2*

The portions of the cracked gasoline passing over with the current of hydrogen chloride on carrying through the Example 1 are conducted together with the latter over a contact mass consisting of asbestos carrying bismuth chloride and collected in a receiver cooled by ice. The condensate obtained is brought into reaction with 200 grms. phenol in the presence of each 5 grms. aluminum chloride and zinc chloride at 60° C for 12 hours. Instead of separately collecting the vapors in a receiver cooled by ice they may also be directly conducted into the phenol in the presence of the catalysts mentioned. The escaping vapors are conducted through a second receiver which is warmed at 50–60° C. and loaded with 6 grms. aluminum chloride and 100 grms. phenol.

After washing the reaction mixture with water and suitable further working up, about 150 grms. of gasoline not entered into reaction, 160 grms. unaltered phenol and 250 grms. substituted phenols as well as about 10 liter of gaseous portions are obtained. The mixture of substituted phenols is of light brown color and after distillation in vacuo almost colorless. After protracted standing crystalline portions separate out which consist of p-tert. amylphenol.

The liquid or gaseous portions of the cracked gasoline, which did not enter into reaction, contain traces of halogen compounds. In case they are intended to be employed as motor fuel a further suitable treatment with alkalies is still required.

*Example 3*

Gaseous hydrogen chloride is passed through a mixture of 150 grms. U. S. P. cresol and each 4 grms. aluminium chloride and zinc chloride to the point of saturation (about 40 grms. being required therefore). 200 grms. of the cracked gasoline employed according to Example 1 are gradually added and the temperature is then increased to 50° C. and maintained for 12 hours. After suitably working up the reaction mixture about 85 grms. gasoline, 45 grms. cresol not entered into reaction and 90 grms. of a mixture of relatively high substituted phenols are obtained. About 10 liter of gaseous portions (about 30 grms.) escape during the condensation. The mixture of substituted cresols is of rather pale-brown color and of middle-viscous appearance. The portion of the U. S. P. cresol which did not enter into reaction contains only a little m-cresol. The recovered gasoline shows equally advantageous properties and quite similar constituents as that obtained according to Example 1.

*Example 4*

1000 grms. of cracked gasoline of American origin which is obtained by cracking gas oil in the vapor phase without application of pressure and which practically completely consists of unsaturated aromatic and non-aromatic hydrocarbons, 200 grms. of phenol and 40 grms. of aluminum chloride are heated under reflux condenser for 16 hours at 50–80° C. The gaseous portions escaping hereby are mixed with hydrogen chloride and are either first conducted over a contact mass consisting of asbestos carrying bismuth chloride, or directly into a mixture of 50 grms. of phenol and 3 grms. of aluminum chloride heated up to 100° C. The gaseous portions which also in this case remain uncombined are freed from hydrogen chloride and collected in a gasometer.

When worked up in a way as described in Example 1, about 810 grms. of substituted phenols which almost completely have been formed in the first reaction vessel, 400 grms. of phenol not entered into reaction and 360 grms. of portions of the cracked gasoline not entered into reaction are obtained. About 20 liter gaseous portions are collected in the gasometer.

The substituted phenols are of dark brown color and of viscous appearance. If subjected to distillation in vacuo 45–50 per cent of the phenols may be obtained in the form of a light colored distillate boiling between 100 and 250° C. (12 mms.). The portions having the lowest boiling point are thinly liquid, those having a higher boiling point viscous to resinous. The residue consists of a hard, dark resin which e. g. is readily soluble in drying oils and which may directly be employed for the preparation of oil varnishes in an advantageous manner. This specific gravity of the portions of the cracked gasoline which did not enter into reaction is 0.873. This gasoline almost completely consists of benzene and homologues. They are absolutely free of the particularly disagreeable odor of the original cracked gasoline, the specific gravity of which is 0.838.

*Example 5*

The cracked gasoline employed according to Example 4 is divided in two approximately equally large parts by distillation up to 85° C. About 5 per cent of gaseous portions are collected separately.

500 grms. of the fraction boiling up to 85° C., 200 grms. of phenol and 6 grms. of zinc chloride are warmed up to 40° C. and 10 grms. of tert. butylchloride are added gradually. Thereupon the reaction mixture is maintained at this temperature for further 48 hours.

About 280 grms. of substituted phenols, 90 grms. of phenol not entered into reaction and 300 grms. of unaltered portions of the fraction of the cracked gasoline in addition to 10 liter of gaseous portions which have already been collected during the reaction, are obtained after suitably working up the reaction mixture.

The substituted phenols obtained according to this example are of dark brown color. Also after distillation in vacuo there remains a considerable amount of a hard resinous residue of similar properties as that obtained according to Example 4.

The liquid portions of the cracked gasoline which did not enter into reaction almost completely consist of benzene. Under otherwise equal conditions the yield of substituted phenols is only about 50 grms. if no butyl chloride is coemployed; the yield is not substantially increased even if hydrogen chloride or the like is simultaneously employed. Instead of tert. butyl-chloride there may also be employed another tertiary chloride or a tertiary dichloride, such as dipentene dihydrochloride, or benzyl chloride and the like. When employing aluminium chloride instead of zinc chloride, however, the yield of substituted phenol is about equal to that achieved hereinbefore by means of zinc chloride and butyl chloride, also without employing butyl-chloride or similarly acting halides.

*Example 6*

6 grms. of aluminum chloride are added in small portions to a mixture of 200 grms. of the fraction boiling above 85° C. of a cracked gasoline of American origin and 100 grms. of technical xylenol boiling between 207° and 217° C. The mixture is heated for 48 hours at 50–60° C. after the considerable self-hardening has ceased.

The reaction mixture is freed from the unaltered portions of the cracked gasoline (120 grms.) by distillation after having been washed with water. These portions almost completely consist of toluene and xylenes. The remaining mixture of substituted phenols (175 grms.) together with unaltered portions of xylenols contained therein may serve for the production of readily oil soluble aldehyde resins.

*Example 7*

500 grms. of the gasoline fraction used in Example 6 are condensed with 100 grms. of phenol by adding 2 grms. of zinc chloride and 2 grms. of ferric chloride and 10 grms. of dipentene hydrochloride obtained by introducing hydrochloric acid into dipentene. The condensation is first carried out at about 60° C. in a flask provided with a reflux condenser, the temperature being raised after a few hours at about 100° C. and maintained for 24 hours. A small portion of the low boiling inactive part of the gasoline is distilled off hereby. After washing the reaction mixture and distilling off the portion of the gasoline which did not enter into condensation reaction, about 300 grms. of a hard resin are obtained, which is readily soluble in drying oils and petroleum hydrocarbons. The phenol has been compounded practically quantitatively. The uncombined part of the gasoline mainly consists of aromatic hydrocarbons and only to a very small extent of olefinic, apparently monoolefinic hydrocarbons, which, however, are free of any disturbing odor.

*Example 8*

100 grms. of dihydroxy naphthalene (1.8) are condensed in a way analogous to that described in the preceding example with 300 grms. of the total fraction boiling above 100° C. of a cracked gasoline of the type described in Example 1. About 200 grms. of a viscous phenolic condensation product are obtained which can not be distilled without decomposition. It may serve for the preparation of aldehyde resins showing special properties.

When employing e. g. sulfuric acid as condensing catalyst there are not only much greater technical difficulties to overcome, but the products obtained are mostly also much darker than those prepared according to the method of Friedl-Crafts. My process may be carried out on commercial scale in iron apparatus. This does not only constitute an economic advantage but the process is also particularly readily performed in the presence of iron.

In the following claims the term "cracking gasoline" is intended also to comprise a technical mixture of substances comprising gaseous and liquid stuffs which contain a substantial proportion of compounds having at least one non-aromatic multiple linkage, and which are obtained by thermic decomposition of higher molecular substances such as shale oils, brown coal tar oils, waste fats.

What I claim is:

1. A process for preparing a gasoline mainly consisting of aromatic hydrocarbons, which consists in reacting with the aid of a condensing catalyst being a member of a group consisting of aluminum, iron and zinc halides, at temperatures ranging from room to boiling temperature and during a prolonged period of time (1) a cracking gasoline obtained by cracking in the vapor phase with (2) a phenol in such quantity as to combine therewith substantially all olefinic and polyolefinic compounds, and removing any excess phenol and the substituted phenols formed.

2. A process according to claim 1, in which the non-phenolic final products are treated with alkalies in order to saponify any organic halides present.

ALOIS ZINKE.